United States Patent [19]

Cookson et al.

[11] 4,370,511
[45] Jan. 25, 1983

[54] FLEXIBLE GAS INSULATED TRANSMISSION LINE HAVING REGIONS OF REDUCED ELECTRIC FIELD

[75] Inventors: Alan H. Cookson, Pittsburgh; William H. Fischer, Wilkins Township, Allegheny County; Kue H. Yoon, Pittsburgh; Jeffry R. Meyer, Penn Hills Township, Allegheny County, all of Pa.

[73] Assignee: Westinghouse Electric Corp., Pittsburgh, Pa.

[21] Appl. No.: 244,587

[22] Filed: Mar. 17, 1981

[51] Int. Cl.³ .................. H01B 9/06; H01B 9/04; H02G 5/06
[52] U.S. Cl. .................. 174/14 R; 174/21 C; 174/28
[58] Field of Search ............ 174/13, 14 R, 16 B, 174/17 GF, 21 R, 21 C, 21 CA, 22 C, 24, 27, 28, 29, 99 R, 99 B, 99 E; 333/244; 134/1, 4, 42

[56] References Cited

U.S. PATENT DOCUMENTS

| | | | |
|---|---|---|---|
| 2,774,944 | 12/1956 | Lintzel | 333/244 |
| 3,038,022 | 6/1962 | Scott | 174/99 B |
| 3,373,242 | 3/1968 | Sewell | 174/21 C |
| 3,573,341 | 4/1971 | Graybill et al. | 174/28 X |
| 3,735,016 | 5/1973 | Spinner | 174/28 |
| 3,760,306 | 9/1973 | Spinner et al. | 333/244 |
| 3,911,937 | 10/1975 | Sletten et al. | 134/4 X |
| 4,053,700 | 10/1977 | Meyer | 174/21 C |
| 4,084,064 | 4/1978 | Bowman | 174/14 R |
| 4,145,565 | 3/1979 | Donon | 174/28 |
| 4,288,652 | 9/1981 | Kemeny et al. | 174/21 C |

FOREIGN PATENT DOCUMENTS

| | | | |
|---|---|---|---|
| 2526671 | 12/1976 | Fed. Rep. of Germany | 174/22 C |
| 1397698 | 3/1965 | France | 174/28 |
| 654960 | 3/1979 | U.S.S.R. | 174/28 |

Primary Examiner—Laramie E. Askin
Attorney, Agent, or Firm—J. P. Hillman

[57] ABSTRACT

A gas insulated transmission line having radially flexible field control means for reducing the electric field along the periphery of the inner conductor at predetermined locations wherein the support insulators are located. The radially flexible field control means of the invention includes several structural variations of the inner conductor, wherein careful controlling of the length to depth of surface depressions produces regions of reduced electric field. Several embodiments of the invention dispose a flexible connector at the predetermined location along the inner conductor where the surface depressions that control the reduced electric field are located.

43 Claims, 9 Drawing Figures

FLEXIBLE GAS INSULATED TRANSMISSION LINE HAVING REGIONS OF REDUCED ELECTRIC FIELD

GOVERNMENT RIGHTS STATEMENT

The Government has rights in this invention pursuant to Contract No. ET-78-C-01-2870 awarded by the United States Department of Energy.

BACKGROUND OF THE INVENTION

1. Field of the Invention

The invention relates in general to insulated transmission lines and in particular to compressed gas insulated transmission lines having reduced electric field regions.

2. Description of the Prior Art

In general two common types of insulators are used for supporting the inner high voltage conductor centrally within the outer conductor of a compressed gas insulated transmission line. A post insulator having metallic inserts at both ends wherein the post simply screws onto a stud secured in the inner conductor and an insulator which is cast in place around the inner conductor onto a thin metal sleeve which is secured to the inner conductor. The post insulator is relatively low in cost and has a high flashover voltage. The major disadvantage is that as a result of the metallic inserts, although the external surface stress is low, the internal stress of certain post insulators is high, which may result in volume punctures through the post insulator. The high internal stress is due to the fact that the voltage gradient between the inner and outer conductor must be withstood by that portion of the insulator which lies between the metallic inserts and therefore is subjected to an increased electric field greater than the field present in the surrounding gas insulating medium. Insulators which are cast around the inner conductor are not subjected to this phenomenon since internal fields are lower. However, both types of insulator are subjected to high electrical fields at the critical insulator-conductor interface region, which can lead to flashover and a reduced life expectancy for the insulator. Accordingly, it would be desirable to have a transmission line wherein portions of the inner conductors are arranged to produce regions of reduced electrical field at the insulators. Further, it would be desirable if the arrangement or structure of the portion of the inner conductor that decreased the electric field would also provide for flexibility of the inner conductor, which is desirable for the design of flexible transmission lines.

SUMMARY OF THE INVENTION

Briefly, the present invention is a transmission line including an outer conductor, an inner conductor adapted for connection to an external energizing source and disposed interiorly within the outer conductor, means for insulatedly supporting the inner conductor within the outer conductor, and radially flexible field control means for reducing at a predetermined location along the periphery of said inner conductor the electrical field created when said inner conductor is energized. Disposing the support insulators of the transmission line at these predetermined locations results in reducing the stress level in the insulators, especially at the critical insulator conductor interface region. The transmission line of the invention may have an alternating gas disposed within the annular space between said outer and inner conductors at a predetermined pressure and would therefore comprise a compressed gas insulated transmission line. The radially flexible field control means of the invention includes several arrangements or structural variations of the inner conductor for reducing the electric field at predetermined locations where a post type insulator would be disposed to support the inner conductor; or the insulator may be cast around the entire inner conductor at this predetermined location. The inner conductor arrangements or structure at the predetermined portions of the inner conductor which bring about the reduction in electrical field comprise surface depressions having a predetermined length to width ratio disposed in the inner conductor. The surface depressions specifically include those formed by pressing, spinning, casting, or machining the interior conductor, and insertion of a smaller diameter conductor interposed between confronting ends of two juxtaposed inner conductor sections and connecting means for connecting the smaller diameter conductor with the confronting open ends of the two juxtaposed inner conductor sections. The connecting means for connecting the smaller diameter conductor with the two larger diameter juxtaposed conductor sections may include a means for flexing the two juxtaposed conductor sections with respect to each other and with respect to the inner smaller diameter conductor section, for example, spun aluminum flex plates that provide flexibility to the conductor section so joined. The smaller diameter conductor section is provided in one embodiment by joining the smaller diameter ends of the flex plates to produce the requisite surface depression.

BRIEF DESCRIPTION OF THE DRAWINGS

The invention may be understood and further advantages and uses thereof more readily appreciated when considered in view of the following detailed description of the exemplary embodiments, taken with the accompanying drawings, in which.

DESCRIPTION OF THE PREFERRED EMBODIMENTS

Figure 1:
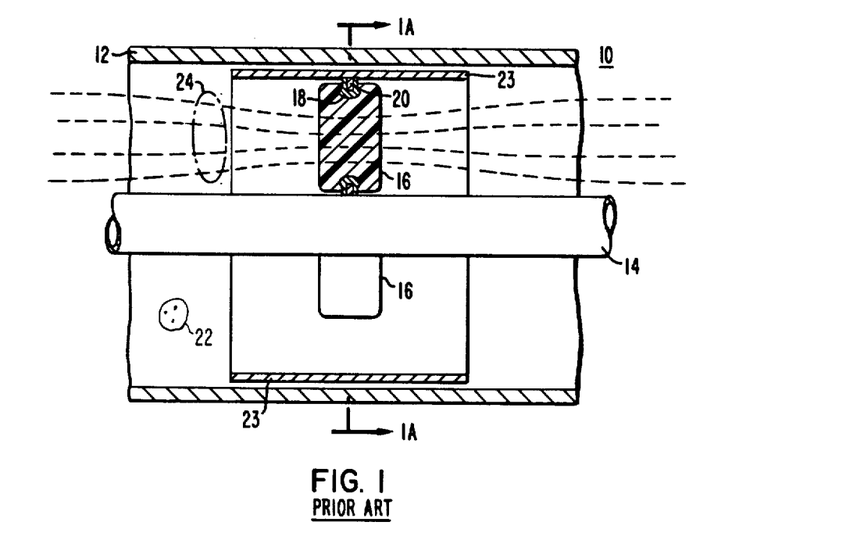
FIG. 1 is a sectional view taken through a gas insulated transmission line of the prior art showing a typical epoxy post insulator supporting the inner conductor and the equipotential lines of the electric field at the location of the insulator.
Figure 1A:
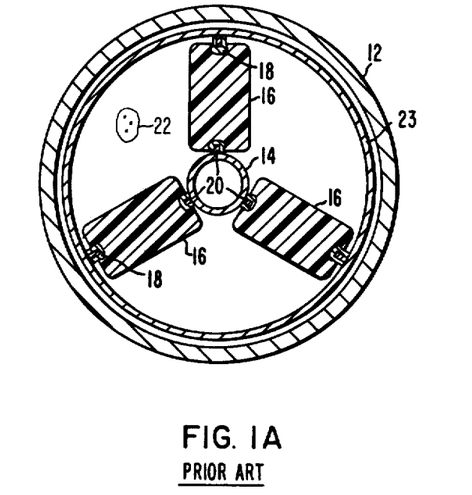
FIG. 1A is a cross sectional view of the transmission line of FIG. 1 taken along the line 1A—1A in FIG. 1.

Referring now to the drawings and to FIGS. 1 and 1A in particular, there are shown a longitudinal vertical sectional view and a cross-sectional view taken through a typical gas insulated transmission line of the prior art. Gas insulated transmission line 10 includes outer conductor 12, inner conductor 14 and cast epoxy post insulator 16 with metallic inserts 18 disposed at opposite ends of post insulator 16 for mounting on studs 20 which are secured to the outer and inner conductors respectively, at predetermined locations. Alternately, the outer mounting stud 20 may be secured to a particle trap such as is shown generally at 23, which particle trap 23 is then rigidly or movably secured to outer conductor 12. Particle trap 23 is similar to the particle traps described in U.S. Pat. No. 4,084,064. The outer and inner conductor 12 and 14 respectively may be formed from copper, aluminum or alloys thereof as is well known in the art. An insulating gas such as sulfur hexafluoride, for example, may be disposed within the annular space between the outer and inner conductors as shown generally at 22. When inner conductor 14 is energized, an electric field E is created within the annular space between the outer and inner conductors. Equipotential lines of field E are shown generally at 24, which equipotential lines are compressed within post insulator 16, because of the metallic inserts 18, into a substantially narrower area than within the annular space between the outer and inner conductors. A major disadvantage of this compression of the electric field as a result of the metallic inserts 18 is that although the external surface stress along post insulator 16 is low, the internal stress is high, typically three times that at the conductor in the gas. Consequently there may be volume punctures through the post. Even where the volume punctures do not occur, the increased stress within the post can substantially reduce the life of the epoxy insulator.

Figure 2:
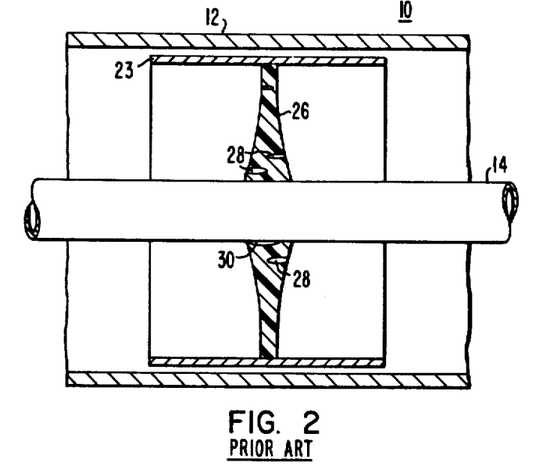
FIG. 2 is a sectional view taken through a gas insulation transmission line of the prior art showing a support insulator cast directly onto the inner conductor for supporting the inner conductor according to the teachings of the prior art.

Referring now to FIG. 2 there is shown a longitudinal vertical sectional view taken through gas insulated transmission line 10 showing an epoxy insulator 26 cast directly onto inner conductor 14. Since epoxy insulator 26 is cast directly onto inner conductor 14, core insulator 26 does not require metallic inserts in opposite ends and therefore the compression of the electric field equipotential lines is not present within insulator 26. However, it is well known in the art that the electric field E created when inner conductor 14 is energized is most intense along the periphery of the inner conductor. It is also well known in the art that any voids such as those shown generally at 28 are subject to discharge which can lead to flashover due to the high fields that exist along the periphery of inner conductor 14. Of particular concern is a void such as shown generally at 30 at the insulator conductor critical interface region which might be created when epoxy insulator 26 is cast upon inner conductor 14. A void here between the conductor and the cast insulator is subject to a field which may be substantially approximated by $\epsilon E$, where E is the value of the electric field at the inner conductor 14 and $\epsilon$ is the value of the dielectric constant of epoxy insulator 26. It is for this reason that insulators such as epoxy insulator 26 are preferably made with a low dielectric constant material. Suitable materials having a low dielectric constant with the requisite mechanical strength necessary for an insulator are usually quite expensive and the manufacture of the insulators out of these materials must be carefully controlled to prevent voids within them. For instance, cast epoxy insulators normally are produced by introducing the epoxy resin within an evacuated chamber in order to minimize the production of voids, especially a void between the inner conductor and the cast insulator, during the casting of the insulator around the inner conductor.

In order to minimize the effects of the field within the post insulator and the critical problem with voids near and at the periphery of the inner conductor on the cast insulators, the gas insulated transmission lines according to the teachings of the invention have a radially flexible field control means for reducing the electric field at predetermined locations along the periphery of the inner conductor at which location the insulators are cast or otherwise disposed. Several embodiments according to the present invention accomplish this by disposing a flexible coupling member arrangement at predetermined locations along the inner conductor to create this region of reduced field and to give the inner conductor necessary flexibility which is combined with a flexible outer conductor such as that described in U.S. Pat. No. 4,288,652 in a corrugated outer sheath gas insulated transmission line to produce flexible transmission lines suitable for conforming to a particular field installation layout.

Figure 3:
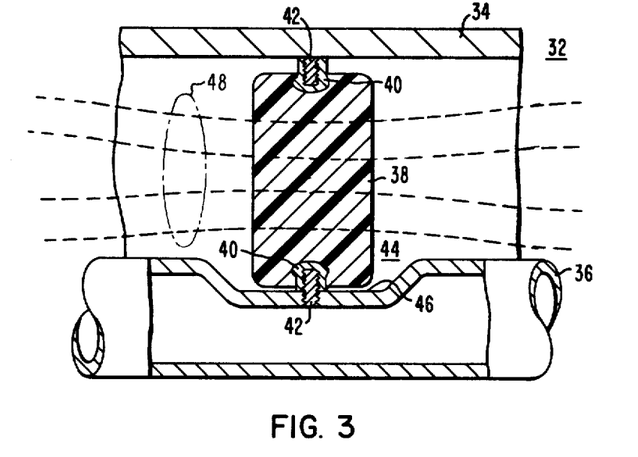
FIG. 3 is a sectional view taken through a gas insulated transmission line according to the teachings of the invention showing an epoxy post insulator supporting the inner conductor at the location of an inner conductor structural arrangement that produces an area of reduced electric field along the periphery of the inner conductor.

Referring now to FIG. 3 there is shown a longitudinal vertical sectional view taken through transmission line 32 according to the teachings of the invention. Transmission line 32 includes outer conductor 34, inner conductor 36, and post insulator 38 having metallic inserts 40 disposed at opposite ends, which metallic inserts are secured to studs 42 disposed in the outer and inner conductor respectively. Transmission line 32 further includes field control means shown generally at 44 for reducing the electric field at a predetermined location along the periphery of inner conductor 36. One embodiment of field control means shown in FIG. 3 is a depressed portion 46 along the surface of inner conductor 36 at a predetermined location. Depressed portion 46 may be formed by pressing, impinging, casting, machining or otherwise forming a depressed portion 46 of the predetermined length to a predetermined depth below the normal surface of inner conductor 36. Equipotential lines 48 of a typical electrical field E are again shown in FIG. 3 and the effect of field control means 44 is demonstrated by the expanded field in the interior of post insulator 38 between metallic inserts 40 wherein the expanded field due to the presence of field control means 44 greatly reduces the internal stress throughout post insulator 38 and reduces stress along the insulator surface.

Figure 4:
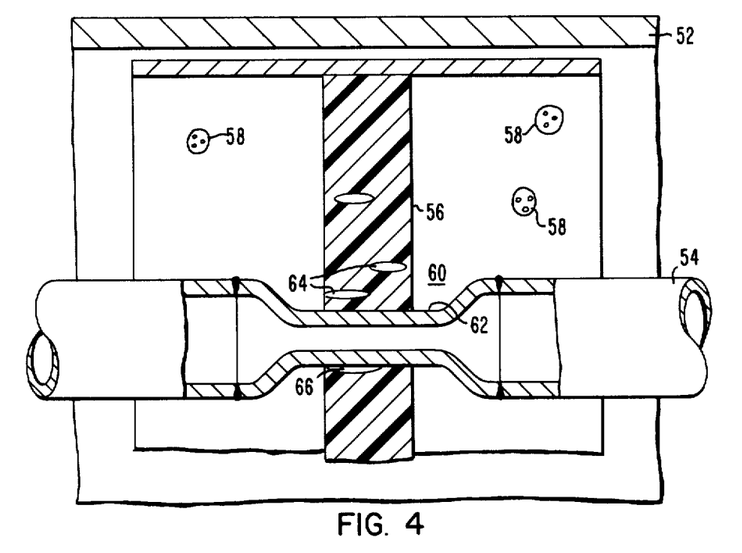
FIG. 4 is a sectional view taken through a gas insulated transmission line according to teachings of the invention showing another embodiment of the structure of a portion of the inner conductor that produces an area of reduced electric field along the periphery of the inner conductor.

Referring now to FIG. 4 there is shown another embodiment of the invention wherein compressed gas insulated transmission line 50 includes outer conductor 52, inner conductor 54 and cast insulator 56, which is cast around the periphery of a predetermined portion of inner conductor 54, and insulating gas shown generally at 58. The field control means shown generally at 60 is now produced by reducing the diameter of the entire circumference of a predetermined portion 62 of inner conductor 54 to produce reduced central portion 62 at a predetermined location along inner conductor 54. Reduced central portion or region 62 may be formed by pressing, casting, spinning, or machining inner conductor 54 at a predetermined area to form the reduced diameter central portion. Cast insulator 56 is cast directly upon reduced central portion or region 62 or may be cast onto a thin metal sleeve (not shown) which is secured to inner conductor central portion 62. Now since the electric field E along the periphery of inner conductor 54 at the predetermined location of field control means 60 has been substantially reduced as described above, voids shown generally at 64 and especially interface void shown generally at 66 are now subject to a substantially reduced electric field and the field that is present in interface void 64 which may be approximated by $\epsilon E$ is reduced commensurately. Field control means 60 also substantially reduces the surface field within this region of insulator 56.

Referring now to FIGS. 3 and 4 and indeed to all the embodiments of the invention it is important to note that the ratio of the depth to the width of the field control means or depressed portions of the interior conductor such as depressed portions 46 and reduced central portion 62 of interior conductors 36 and 54 respectively must be controlled to produce the desired field reduction. Only by careful control of the ratio of the depth to the width of the field control means or depressed portions of the inner conductor can the substantial reduction in the electric field discussed above be obtained. This is because of the shielding effect of the edges of the inner conductor proximate the depressed region of the inner conductor. This shielding effect produces the substantial field reduction along the periphery of depressed region of the inner conductor. Typical ratios of this critical ratio of depth to width of the field control means of the preferred embodiments are within the range for example of 1 to 0.3 and 1 to 3. Beyond a ratio of 1 to 5, the advantages of the field reduction is marginal. The electric field E within the annular space between the outer and inner conductors may generally be represented by the formula $$E = V/[r_1 \ln(R/r)]$$

where $r_1$ is the radius at that we wish to sample the electric field; R is the radius of the outer conductor, r is the radius of the inner conductor and V is the potential difference between the inner and outer conductors. Since the field E varies with the natural log of the ratio R/r, it can be seen that increasing the diameter of the outer diameter to the inner conductor has an effect on the field E only as the natural logarithm of this ratio. From this it can be determined that for some outer to inner conductor arrangements, it is necessary to significantly increase the diameter of the outer conductor to obtain the corresponding field reduction of the invention.

Figure 5:
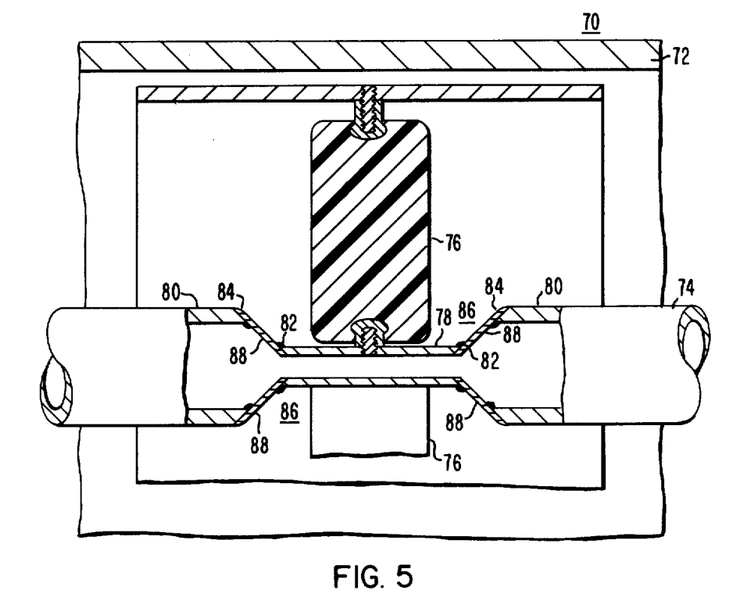
FIG. 5 is a sectional view taken through a gas insulated transmission line according to the teachings of the invention showing an embodiment of the invention wherein the portion of the inner conductor structure that produces an area of reduced electric field also acts as a flexible coupling member.
Figure 6:
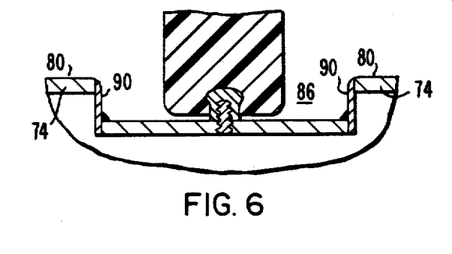
FIG. 6 is a sectional view taken through a gas insulated transmission line according to the invention showing another embodiment of the flexible coupling unit that produces an area of reduced electric field along the periphery of the inner conductor.
Figure 7:
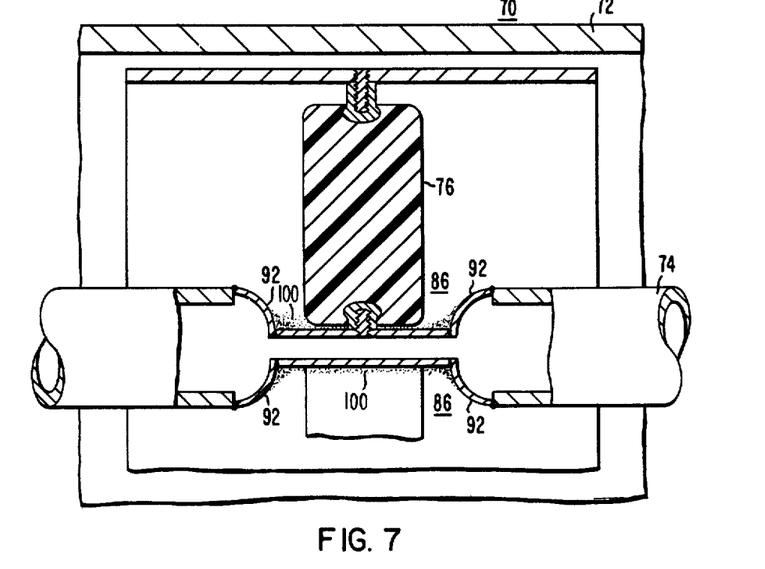
FIGS. 7 and 8 are sectional views taken through a gas insulated transmission line according to the invention showing other embodiments of the flexible coupling unit that produce an area of reduced electric field along the periphery of the inner conductor.

The following embodiments of the invention combine the production of a field control means at a predetermined location along the inner conductor with an inner conductor arrangement for producing flexibility of the inner conductor. Flexible outer conductors are described in U.S. Pat. No. 4,288,652, "Corrugated Outer Sheath Gas Insulated Transmission Line". Referring now to FIG. 5 there is shown a longitudinal vertical sectional view taken through gas insulated transmission line 70 including outer conductor 72, inner conductor 74 and a post insulator 76 being secured to a smaller diameter conductor 78 which is interposed between two juxtaposed tubular inner conductor sections 80. The smaller diameter conductor 78 includes opposite open ends 82 interposed between confronting open ends 84 of the two juxtaposed tubular conductor sections 80. Open ends 82 of smaller diameter conductor 78 and confronting open ends 84 of the juxtaposed tubular conductor sections 80 are joined by a connecting means shown generally at 86 for connecting the open ends of the smaller diameter conductor with the confronting open ends of the two juxtaposed tubular conductor sections. Connecting means 86 is secured to confronting open ends 84 of inner conductor 74 as well as open ends 82 of smaller conductor 78 by welding, brazing, or riveting. Connecting means 86 may include both rigid and flexible conductor connectors but only flexible connecting means will be described hereafter. In FIG. 5 connecting means 86 takes the form of two flexible conical-shaped conductor connections 88. In FIG. 6 there is shown two flexible annularly shaped thin flat plates 90 for connecting means 86. In FIG. 7 there is shown connecting means 86 in the form of two spun aluminum flex plates 92. Spun aluminum flex plates such as flex plates 88 and 92 are commonly made spinning the plates around their axes while cold forming them into desired shapes. Spun aluminum flex plates may take the shape of the conical or annular flat connectors described for FIGS. 5 and 6 respectively or may take the arcuate or spherical shape shown in FIG. 7 or any other shape consistent with joining smaller diameter conductor 78 with the two juxtaposed tubular conductor sections 80 under the criteria of the ratio of the depth to the width of the field control means or depression in the inner conductor discussed earlier.

Figure 8:
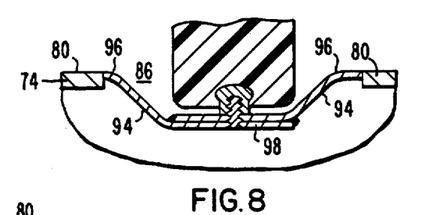

FIG. 8 shows one further embodiment of the spun aluminum flex plates utilized to produce the radially flexible field control means for reducing the electric field at a predetermined location along the inner conductor and providing the inner conductor with flexibility for use in the field. Referring now to FIG. 8 arcuate shaped spun aluminum flex plates 94 each includes a larger diameter end 96 which is substantially equal to the diameter of the two juxtaposed tubular conductor sections 80 and are secured thereto by welding, brazing, riveting or any other securing means known in the art and a smaller diameter end 98, with the smaller diameter ends being overlapped and secured to each other in the same manner.

All of the radially flexible field control means or inner conductor arrangements described herein may be coated with an adhesive for insuring that particles within the reduced field region are trapped and deactivated and isolated so as not to become candidates for causing ionization and subsequent electrical breakdown and insulator flashover. Referring now to FIG. 7 there is shown within field control means or depressed region shown generally at 100 a coating of such an adhesive covering. This adhesive covering may be PLIOBOND, or the polyvinyl copolymers or thermosetting epoxy resin materials described in U.S. Patent No. 3,911,937 or U.S. patent application Serial No. 222,115, filed Jan. 2, 1981, now U.S. Pat. No. 4,327,243, "Gas Insulated Transmission Line with Adhesive Particle Trap Carrier" assigned to the same assignee as the present invention.

In conclusion, there has been described herein means for reducing the electric field at a predetermined location along the periphery of a compressed gas insulated transmission line. The radially flexible field control means described herein have resulted in substantial reductions in the electrical field along the periphery of the inner conductor of such transmission lines where the support insulators would be located. This type of compressed gas insulated transmission line system reduces the fields by such a level that it opens the possibility of being able to reduce the diameter of the transmission lines with corresponding cost savings. It has been demonstrated that the substantial reduction for some embodiments of transmission lines is equal to the reduction that would be experienced by significantly increasing the diameter of the outer conductor. By combining the field control means or depressed areas along the inner conductor with flexible members inserted between confronting inner conductor sections there has been combined the ability to bring about the field reduction along with providing flexibility to the transmission line system.

Although the preferred embodiments of the invention have been described with respect to compressed gas insulated transmission lines because the invention solved certain problems of this type of system, it is to be understood the the invention is not limited thereto but may be broadly applied to any transmission line arrangement. For instance, although the insulators herein have been described as made of cast epoxy materials, it is to be understood that other moldable materials, such as other resin materials as well as polyethylene and polysulfone and other methods of production, such as injection molding stamping etc. have been used with success and are equally suitable.

We claim:

1. A transmission line, comprising:
   (a) an outer conductor;
   (b) an inner conductor adapted for connection to an energizing source and disposed interiorly within said outer conductor;
   (c) support means for insulatedly supporting said inner conductor within said outer conductor; and
   (d) radially flexible field control means for reducing at a predetermined location along the periphery of said inner conductor the electric field created when said inner conductor is energized and permitting radial flexing of said inner conductor.

2. The transmission line of claim 1 wherein said outer conductor and said inner conductor are spaced apart by said support means in a coaxial arrangement.

3. The transmission line of claim 1 wherein said support means is located at the location of said radially flexible field control means.

4. The transmission line of claim 3 wherein the support means includes an insulator, said insulator being disposed at the predetermined location of the radially flexible field control means to increase the flashover voltage along said insulator between the inner and outer conductor and to bend the equipotential lines proximate the inner conductor radially inward towards said inner conductor to thereby reduce the electrical field within said insulator, and along said insulator surface.

5. The transmission line of claim 1 wherein the radially flexible field control means includes a surface depression disposed at the predetermined location on the inner conductor.

6. The transmission line of claim 5 wherein the depth and the width of the surface depression have a predetermined ratio.

7. The transmission line of claim 6 wherein the ratio is within the range of 1:1 to 1:3.

8. The transmission line of claim 1 wherein the inner conductor includes two juxtaposed tubular conductor sections of a first predetermined diameter having confronting open ends and the radially flexible field control means includes a smaller diameter open ended tubular conductor of a predetermined length and diameter interposed between said confronting open ends of said two juxtaposed conductor sections and radially flexible connecting means flexibly connecting the open ends of said smaller diameter conductor with said confronting open ends of said two juxtaposed tubular conductor sections to permit radial flexing of said two juxtaposed tubular conductor sections.

9. The transmission line of claim 8 wherein the difference in the diameters of the smaller diameter conductor and the tubular conductor sections and the predetermined length of the smaller diameter conductor has a predetermined ratio.

10. The transmission line of claim 9 wherein the predetermined ratio is within the range of 1:1 to 1:3.

11. The transmission line of claim 10 wherein the radially flexible connecting means includes two radially flexible conical-shaped conductor sections.

12. The transmission line of claim 10 wherein the radially flexible connecting means includes two flexible annular flat plates.

13. The transmission line of claim 10 wherein the radially flexible connecting means includes two spun aluminum arcuate shaped flex plates to permit the radial flexing motion of the two juxtaposed tubular conductor sections.

14. The transmission line of claim 8 wherein the radially flexible connecting means includes two radially flexible conical conductor sections.

15. The transmission line of claim 8 wherein the radially flexible connecting means includes two flexible annular flat plates.

16. The transmission line of claim 8 wherein the radially flexible connecting means includes two spun aluminum arcuate shaped flex plates to permit the radial flexing motion of the two juxtaposed tubular conductor sections.

17. The transmission line of claim 11, 12, 13, 14, 15 or 16 wherein the support means includes an insulator, said insulator being disposed at the smaller diameter conductor, the reduced field created at the location of the smaller diameter conductor bending the electrical field equipotential lines proximate the smaller diameter conductor radially inward towards the smaller diameter conductor thereby decreasing the electric field within said insulator.

18. The transmission line of claim 11, 12, 13, 14, 15 or 16 wherein the support means includes a cast insulator, said cast insulator being cast around the smaller diameter conductor, the reduced field created at the location of the smaller diameter conductor increasing the flashover voltage.

19. The transmission line of claim 8 wherein the support means includes an insulator, said insulator being disposed at the smaller diameter conductor, the reduced field created at the location of the smaller diameter conductor bending the electrical field equipotential lines proximate the smaller diameter conductor radially inward towards the smaller diameter conductor thereby decreasing the electric field within said insulator.

20. The transmission line of claim 8 wherein the support means includes a cast insulator, said cast insulator being cast around the smaller diameter conductor, the reduced field created at the location of the smaller diameter conductor increasing the flashover voltage.

21. The transmission line of claim 1 wherein the support means includes a cast insulator, said cast insulator being cast around said inner conductor at the predetermined location of the radially flexible field control means to increase the flashover voltage and reduce the electric field within said cast insulator.

22. The transmission line of claim 1 wherein the radially flexible field control means for reducing the electrical field at a predetermined location along the inner conductor is coated with an adhesive to insure any particles in the reduced field region are trapped and deactivated.

23. A gas insulated transmission line, comprising:
(a) an outer conductor;
(b) an inner conductor adapted for connection to a high potential energizing source and disposed interiorly within said outer conductor;
(c) support means for insulatedly supporting said inner conductor within said outer conductor;
(d) an insulating gas disposed within the space between said outer and inner conductors; and
(e) radially flexible field control means for reducing at a predetermined location along the periphery of said inner conductor the electric field created when said inner conductor is energized and permitting radial flexing of said inner conductor.

24. The gas insulated transmission line of claim 23 wherein said outer conductor and said inner conductor are spaced apart by said support means in a coaxial arrangement.

25. The gas insulated transmission line of claim 23 wherein said support means is located at the location of said radially flexible field control means.

26. The gas insulated transmission line of claim 23 wherein the radially flexible field control means includes a surface depression disposed at the predetermined location on the inner conductor.

27. The gas insulated transmission line of claim 26 wherein the depth and the width of the surface depression have a predetermined ratio.

28. The gas insulated transmission line of claim 27 wherein the ratio is within the range of 1:1 to 1:3.

29. The gas insulated transmission line of claim 23 wherein the inner conductor includes two juxtaposed tubular conductor sections of a first predetermined diameter having confronting open ends and the radially flexible field control means includes a smaller diameter open ended tubular conductor of a predetermined length and diameter interposed between said confronting open ends of said two juxtaposed conductor sections and radially flexible connecting means flexibly connecting the open ends of said smaller diameter conductor with said confronting open ends of said two juxtaposed tubular conductor sections to permit radial flexing of said two juxtaposed conductor sections.

30. The gas insulated transmission line of claim 29 wherein the difference in the diameters of the smaller diameter conductor and the tubular conductor sections and the predetermined length of the smaller diameter conductor has a predetermined ratio.

31. The gas insulated transmission line of claim 30 wherein the predetermined ratio is within the range of 1:1 to 1:3.

32. The gas insulated transmission line of claim 29 wherein the radially flexible connecting means includes two radially flexible conical-shaped conductor sections.

33. The gas insulated transmission line of claim 29 wherein the radially flexible connecting means includes two flexible annular flat plates.

34. The gas insulated transmission line of claim 29 wherein the radially flexible connecting means includes two spun aluminum spherical shaped flex plates to permit lateral flexing motion to the two juxtaposed tubular conductor sections.

35. The gas insulated transmission line of claim 29 wherein the support means includes a post insulator, said post insulator being disposed at and secured to the smaller diameter conductor, the reduced field created at the location of the smaller diameter conductor bending the electrical field equipotential lines proximate the smaller diameter conductor radially inward towards the smaller diameter conductor thereby decreasing the electric field within said post insulator.

36. The gas insulated transmission line of claim 29 wherein the support means includes a cast insulator, said cast insulator being cast around the smaller diameter conductor, the reduced field created at the location of the smaller diameter conductor increasing the flashover voltage.

37. The gas insulated transmission line of claim 23 wherein the support means includes a post insulator, said post insulator being disposed at the predetermined location of the radially flexible field control means to increase the flashover voltage along said post insulator between the inner and outer conductor and to bend the equipotential lines proximate the inner conductor radially inward towards said inner conductor to thereby reduce the electrical field within said post insulator, and along said post insulator surface.

38. The gas insulated transmission line of claim 23 wherein the support means includes a cast insulator, said cast insulator being cast around said inner conductor at the predetermined location of the radially flexible field control means to increase the flashover voltage and reduce the electric field within said cast insulator.

39. The gas insulated transmission line of claim 23 wherein the radially flexible field control means for reducing the electrical field at a predetermined location along the inner conductor is coated with an adhesive to insure any particles in the reduced field region are trapped and deactivated.

40. A transmission line, comprising:
(a) an outer conductor;
(b) an inner conductor adapted for connection to an energizing source and disposed interiorly within said outer conductor; said inner conductor including two juxtaposed tubular conductor sections of a first predetermined diameter having confronting open ends;
(c) support means for insulatedly supporting said inner conductor within said outer conductor; and
(d) radially flexible field control means for reducing at a predetermined location along the periphery of said inner conductor the electric field created when said inner conductor is energized and permitting radial flexing of said inner conductor, said radially flexible field control means including two spun aluminum spherical shaped flex plates each having a larger diameter end substantially equal to the diameter of the two juxtaposed tubular conductor sections and a smaller diameter end, said larger diameter ends being secured to said confronting ends of said two juxtaposed tubular conductor sections and said smaller diameter ends being overlapped and secured to each other.

41. The transmission line of claim 40 wherein the support means includes an insulator, said insulator being disposed at the overlapped smaller diameter ends of the two spun aluminum spherical shaped flex plates, the reduced field created at the location of the smaller diameter conductor bending the electrical field equipotential lines proximate the smaller diameter conductor radially inward towards the smaller diameter conductor thereby decreasing the electric field within said insulator.

42. The transmission line of claim 40 wherein the support means includes a cast insulator, said cast insulator being cast around the overlapped smaller diameter ends of the two spun aluminum spherical shaped flex plates, the reduced field created at the location of the smaller diameter conductor bending the electric field equipotential lines proximate the smaller diameter conductor radially inward towards the smaller diameter conductor thereby decreasing the electric field within said cast insulator.

43. A gas insulated transmission line, comprising:
(a) an outer conductor;
(b) an inner conductor adapted for connection to an energizing source and disposed interiorly within said outer conductor, said inner conductor including two juxtaposed tubular conductor sections of a first predetermined diameter having confronting open ends;
(d) an insulating gas disposed within the space between said outer and inner conductors; and
(e) radially flexible field control means for reducing at a predetermined location along the periphery of said inner conductor the electric field created when said inner conductor is energized and permitting radial flexing of said inner conductor, said radially flexible field control means including two spun aluminum spherical shaped flex plates each having a larger diameter end substantially equal to the diameter of the two juxtaposed tubular conductor sections and a smaller diameter end, said larger diameter ends being secured to said confronting ends of said two juxtaposed tubular conductor sections and said smaller diameter ends being overlapped and secured to each other.

* * * * *